Patented Aug. 23, 1949

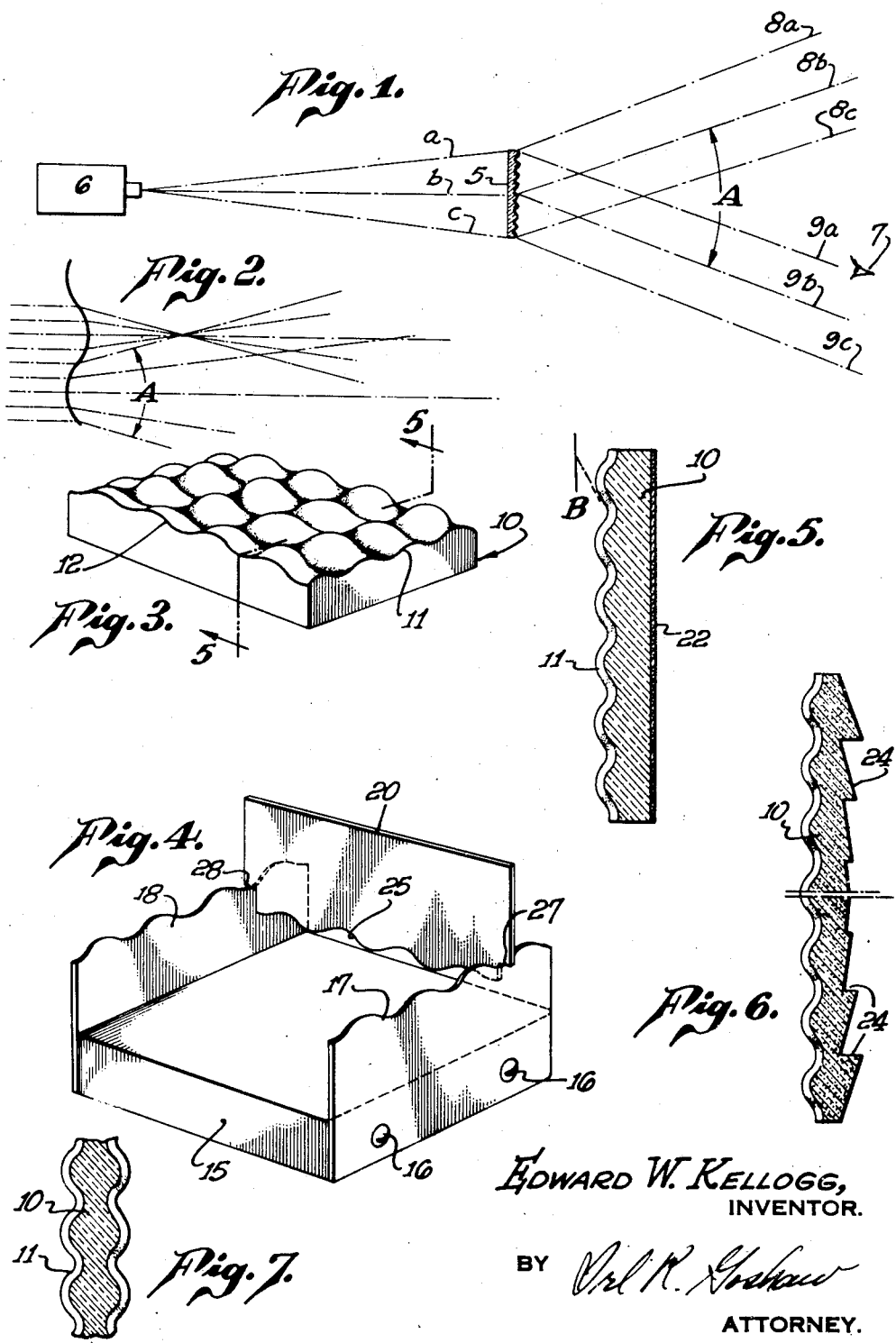

2,480,031

UNITED STATES PATENT OFFICE 2,480,031

REAR-PROJECTION SCREEN

Edward W. Kellogg, Indianapolis, Ind., assignor to Radio Corporation of America, a corporation of Delaware Application December 23, 1944, Serial No. 569,529

13 Claims. (Cl. 88—28.93)

This invention relates to viewing screens, and particularly to the rear projection type of screen wherein light is projected on one side of the screen and viewed by an observer on the opposite side of the screen.

Most translucent screens have the property of approximating random diffusion of light. One of the most familiar methods of producing a surface having random diffusing properties is to give a glass surface a coarse etching or sand blasting. Random diffusion is also produced by incorporating in glass or other material small particles of transparent material having an index of refraction differing considerably from that of the body of the material. In the last mentioned manner, the diffusion can be carried as far as desired, but the condition is then approached in which nearly half of the light is sent back toward the source, and this is obviously very inefficient. Not only is it wasteful of useful light, but the fact that much of the light returns toward the side from which it came means that light in the room where the observers sit produces a haze over the picture. Practical designs of screens, therefore, are compromises, with only the amount of diffusion which is found to be necessary for a reasonably uniform picture.

Sand blasting one surface of a glass screen gives nearly random diffusion or spreading of the light, but it is found that an undesirably large fraction of the incident light passes through with only small angles of deflection. When a picture is viewed with such a screen, the portion adjacent to a line between the observer's eye and the projector is very bright and the remainder of the picture entirely too dark. Therefore, it is common to etch or sand blast two surfaces or else supplement the roughening of one surface by some additional means of diffusion. The fundamental fault with diffusing screens made in such a manner is that the proportions of the surface at various angles to the average are controlled in a haphazard manner and a disproportionate fraction of the surface makes only small angles with the average plane. On the other hand, a certain fraction of the minute surfaces through which the light is refracted make unnecessarily large angles and thereby throw light in directions where it is not useful for presenting a satisfactory picture because there is not enough in these directions to make a satisfactory picture, and moreover, the picture, if viewed from these directions would be badly distorted in shape. Such scattering of light in useless directions not only wastes the useful light, but it also causes much of the light from the viewing room to reach the back surface at acute angles and thereby be reflected back into the room.

In order to provide rear-projection screens which are relatively free from these faults, it has been proposed in several U. S. patents, for example No. 1,970,358, to form at least one of the surfaces of a transparent material to a definitely calculated geometrical pattern wherein it is possible to set the maximum angle of departure of elements of the surface from the average surface plane and to so shape the surfaces that the elements of area are substantially equally distributed throughout all angles between zero and this maximum.

Such a screen should give a satisfactorily bright picture for all points of view within a certain limited angle and almost no visible light beyond this angle. My invention belongs to this class of rear-projection screens wherein at least one surface is given a contour which can be described in mathematical or geometrical terms. It is obvious that all screens of this type must be constituted of repeating figures and that each such figure or elemental geometrical shape must be small in comparison with an element of the projected picture. In other words, the observer should see a satisfactorily clear and detailed picture, but he should scarcely be able to see the corrugations or shape elements of the screen surface.

The present invention is directed to a screen constructed of transparent material, such as glass, with or without small particles therein having a different index of refraction, as will be described hereinafter, the observable side of the screen being formed with two sets of corrugations at right angles to one another, and of such size as to provide the proper picture detail. Although a screen having a single series of corrugations on one side of the screen and another series of corrugations at right angles thereto on the opposite side of the screen has been suggested, there is an important advantage in placing both series of corrugations on the viewing side of the screen, for this breaks up reflections and permits the use of the other side of the screen for additional refractions. It is well known that a corrugated specular surface shows lines of light transverse to the corrugations as the reflections of bright objects in the room, if the corrugations have straight axes, or, in other words, have cylindrical surfaces generated by a straight generatrix.

The double series of corrugations on the same surface, will show only a general haze.

By the use of molded annular corrugations on the projection side of the screen to form a large Fresnel lens, the divergence of the light from the projector may be offset. The screen which utilizes only two refractions, neither of which is excessive in magnitude, will transmit nearly all of the room light through to the compartment behind the screen, which is normally blackened so that this light does not return.

A further major reduction of room reflection can be obtained by treating the surfaces of the screen by either of two known measures which greatly reduce reflections at the surfaces. One of these measures consists in depositing on the surface a layer a quarter wave length thick, of a material having an index of refraction intermediate between those of glass and air, while the other measure, applicable to certain glasses, consists in etching the surface in a carefully controlled manner, leaving a skeletonized silica surface of sub-microscopic structure, which is not visibly rough, but which gives very weak reflections. When both surfaces of the screen are given such reflection reducing treatment, a larger fraction of the useful light is tranmitted outward, and a larger fraction of light from the room is transmitted through to the back and absorbed, and hence, does not cause haze or fog in the projected picture.

Because of the difficulties of forming a surface in exact accordance with a mathematical specification of shape, it may be found that slight unevenness of brightness over the picture appears, and to avoid this it may be desirable to employ a very small amount of additional refraction, as by slightly roughening one of the surfaces in addition to the corrugations. Another method of producing slight additional refraction or spreading of the light, is to incorporate in the material of the screen, or in a layer thereof, particles of a material having a slightly different index of refraction from the body of the screen. This produces a very limited diffusion of random nature, since the refraction at each surface is so small that the light passes through a number of particles with only a slight deviation in direction. In this manner, it is easy to use enough particles to make the diffusion random in character, but limited in total amount or average angle of spread. The expedient of adding a random spreading to that caused by the corrugations should not be used for the purpose of materially increasing the total spread of the light beyond that produced by the corrugations, but only to slightly "soften" the emergent light rays.

If the needed total spread cannot be obtained from one corrugated surface without reaching, at points, such steep angles that there is danger of some of the light being totally internally reflected, the required refraction should be divided between the two surfaces by molding similar corrugations into both sides. The two sets of corrugations do not necessarily have to have equal depths or curvatures, but must have identical pitches, and be so placed relative to each other that the high points on one side are opposite the high points on the other side, and the low points opposite the low points, so that the elemental lenses will be either bi-convex or bi-concave, but never concavo-convex. By such registered corrugations, the maximum angle can be made substantially one-half that which would be required with a single corrugated surface.

The use of alternate concave and convex corrugations facilitates molding of the screen, since imperfections in molding result in a fillet wherever there is a sharp bottomed groove or a rounding off of the edge wherever there is a sharp ridge. Such a sharp sided screen would not, therefore, diffuse the light in exactly the manner desired and wherever the angle of all parts of the surface is not controlled there is danger that a "hot spot" may result; such, for example, as occurs when too much of the surface is practically parallel to the back. Alternate corrugations which provide approximately equal areas of concave and convex surfaces avoid these difficulties.

The principal object of the invention, therefore, is to facilitate the observation of projected images.

Another object of the invention is to provide an improved rear-projection screen which provides a brighter image through a predetermined angle.

A further object of the invention is to provide a new rear-projection screen having improved characteristics.

A further object of the invention is to provide a screen which will minimize haze or patterns of light due to sources of light within the viewing room.

A further object of the invention is to provide an improved rear-projection screen which provides a more uniform and brighter picture and eliminates regions of excessive brightness or "hot spots."

A still further object of the invention is to provide a double corrugated surface of a predetermined configuration for a viewing screen.

A still further object of the invention is to provide a double corrugated screen without sharp grooves or ridges in any section thereof.

Although the novel features which are believed to be characteristic of this invention will be pointed out with particularity in the appended claims, the manner of its organization and the mode of its operation will be better understood by referring to the following description read in conjunction with the accompanying drawings forming a part hereof in which:

Fig. 1 is a diagrammatic view of a system utilizing a screen embodying the invention.

Fig. 2 is a diagram showing how the concave and convex surfaces spread the emergent light.

Fig. 3 is a perspective view of an enlarged model of a portion of the screen showing the double configuration of one surface of a screen embodying the invention.

Fig. 4 is a perspective view showing the method of and means for forming the model illustrated in Fig. 3, and likewise illustrating the essential elements of means for forming the pattern for the mold for producing the screen of the invention.

Fig. 5 is a cross sectional view of the screen section shown in Fig. 3 taken along the line 5—5, and showing a backing layer in accordance with the invention.

Fig. 6 is a cross sectional view showing another modification of the screen in accordance with the invention, and Fig. 7 is a cross sectional view of a small portion of a screen designed for large angles of spread.

Referring now to Fig. 1, a screen 5 constructed in accordance with the invention is shown positioned between a picture projector 6 and an observer indicated by the eye 7. The screen is thus used as a rear-projection screen wherein the projected light is impressed on one side of the screen, as shown by rays $a$, $b$, and $c$, and the image observed from the opposite side. The emergent rays are shown at $8a$, $8b$, $8c$, $9a$, $9b$, and $9c$, while the angle of spread is indicated by the double-headed arrow A between rays $8b$ and $9b$. The observation point 7 is shown as within the angle A for all parts of the screen, and under these conditions all parts of the picture will appear at full brightness.

Fig. 2 shows how parallel light, striking the corrugated surface, has its rays bent through various angles ranging from zero to a maximum which is half of the total angle of spread A.

In Fig. 3, a perspective view of an enlarged section of the screen is shown, the screen having a body portion 10 of transparent material, such as glass, Lucite, or similar material, one surface of which has a plurality of series of alternate concave and convex corrugations 11 in one direction, and another plurality of series of alternate concave and convex corrugations 12 in a direction at right angles to the first direction. Although the curvature of these corrugations may be circular, I prefer to make them in parabolic form with the pitch of the corrugations in both directions substantially less than the size of a picture element to reproduce the required detail. Since it is desired to provide a larger angle of observation in the horizontal plane than in the vertical plane, the focal length of the corrugations will be less in the horizontal than in the vertical plane. This assumes that the pitch of the corrugations will be approximately the same in the two cases. It should be understood that it is not focal length alone that determines angle of spread, but the combination of focal length and pitch, the maximum angle of deviation of any portion of the surface from the plane of the screen as shown at B in Fig. 5, being a measure of the maximum deflection of light beams.

The screen described herein is especially suitable for small rear-projection screens such as are used in cabinets, but screens which are too large to mold in one piece may be constructed in sections, such as shown in Fig. 3, and joined together in any suitable manner, the sections being molded from molds made in accordance with the method now to be described.

Referring to Fig. 4, a device or apparatus for cutting the pattern for the mold is shown as having a base 15, to two opposite edges of which are attached directrix plates 17 and 18 by means of screws 16. These plates 17 and 18 have corrugated upper edges in the form of alternate parabolic arcs, and serve as the guide for a cutter 20. The cutter is shown in the form of a plate having a sharp edge by which the material is shaved. This cutting edge has alternate series of parabolic arcs similar to those of plates 17 and 18, but not having the same pitch and curvature unless it is desired to have the same angle of spread vertically as horizontally. Material from which the pattern is to be formed is placed between the directrix plates 17 and 18, and the cutting plate 20 is then moved back and forth thereover in the manner of a plane to cut a surface such as shown in Fig. 3.

The cutting plate must be constrained in any suitable manner (not shown) to remain parallel to its initial position which is normal to the axes of the directrix curves 17 and 18. In the early stages of shaving down the matrix material, the directrix plates will not control the height of the cutting plate, since the directrix edges will not reach the tops of the guide notches 27 and 28, but the plates 17 and 18 will prevent sidewise movements of cutter plate 20. As the material is shaved away, the notches 27 and 28 will be lowered and at some portions of the cut be limited by the directrix edges, and at these points the plate can cut no deeper. With continued shaving, the notches rest for more and more of the stroke on the edges of 17 and 18, and finally the entire cutting stroke takes place with the height of the cutter plate 20 controlled entirely by the directrix edges. When this condition is reached, the shaved surface will be corrugated in one direction to fit the shape of the cutting edge 20, and in the other direction to duplicate the shape of the directrix edges 17 and 18. Such a surface can be described in mathematical terms as generated by line 25 which is the generatrix, guided by a directrix 17 or 18. This is analogous to the more common mathematical description of the production of a cylindrical surface, in which the surface is said to be generated by a "generatrix" (which, in the case of a cylinder, is a straight line) which moves in such a path that it always intersects a curved line designated as the "directrix," all positions of the generatrix being parallel to each other.

It is obvious that other mechanical means may be devised to superimpose an upward and downward movement of plate 20 on its forward or cutting stroke motion. For example, a vertical reciprocating movement can be produced with a rotating cam geared to the longitudinal feed, and making one revolution for each repetition of the concave and convex curve. When the pattern is cut, it is used to make a master mold for molding either entire small screens or sections of larger screens.

Assuming that the screen is to be so mounted that the cutting edge 25 determines the shape of the corrugations as shown by a horizontal cross section, while the generatrix curves 17 and 18 determine the shape as shown by a vertical cross section, or, in other words, that the shape of the screen surface is that generated when the generatrix is maintained horizontal and follows the directrix curves which extend vertically, the provision for greater horizontal spread than vertical would preferably be obtained by making the waves in edge 25 deeper and of sharper curvature than the waves in 17 and 18. Although it is possible to increase the light spread by holding the curvature constant and increasing the pitch, it is better design to make the pitch substantially the same in the two directions. It has already been said that the pitch of the corrugations must be smaller than a picture element, say half the size of a picture element, but making the corrugations in either direction any smaller than necessary to meet this requirement only complicates the screen and makes it more difficult to make. By size of a picture element, I mean the spacing of dots in a half-tone picture made with a screen fine enough to give all of the detail which the observer could see if the picture were a photograph instead of a halftone.

It should be understood that the shape of the surface produced by superimposing corrugations in two directions, differs radically from the shape which would be produced by cutting straight corrugations in one direction and then turning the stock around and cutting grooves at right angles to the first set, to form a set of crossed corrugations. Such crossed flutings are easy to make and are widely used in window glass, but in that method of forming, part of the surface cut in the first operation, is destroyed by the second operation, leaving a surface, the elevation of each point of which depends on the contour of the directrix of one of the sets of corrugations, or on the contour of the generatrix, but not of both contours. In the surface produced as herein described, the elevation of each point is equal to the sum of the elevations called for by both of the controlling curves. Such superposition is similar to that which determines the shape of the surface of a liquid at any instant when two sets of straight front waves are traversing a given area at right angles to each other.

As mentioned above, additional refractive properties may be obtained by roughening the surface of the corrugations or the surface upon which the light is projected, or both. This roughening may be obtained by etching or by sand blasting, or, as shown in Fig. 5, by coating the back portion of the screen with a coating 22 having therein small particles having a slightly different index of refraction than the body of the screen. Instead of the coating 22, the body of section 10 may have incorporated therein the small light diffusing particles, as shown in Fig. 6.

Fig. 6 shows a modification of the screen of my invention wherein the surface toward the observers is given the crossed corrugations to spread the light, while the surface toward the projector is formed in the shape of a Fresnel lens of fine convolutions 24 so that the effect of the diverging of the light rays from the projector is neutralized and the light in all parts of the picture approaches the corrugations in a direction substantially normal to the plane of the screen. It is in fact desirable to give the Fresnel lens a refracting power in excess of that required to bring the diverging projector rays to parallelism, and design it so that, in the absence of the corrugations, the light from the projector would re-converge to a point near the back of the viewing space, for this convergence will give more satisfactory overlapping of the cones of spread light and promote evenness of picture brightness. It is obvious that the pitch of the convolutions of the Fresnel lens must also be substantially less than the size of a picture element.

It has already been pointed out that very steep angles between any portion of a corrugation and the average plane of the screen are objectionable as causing some internal reflections, and thereby throwing light in quite different directions than intended, but such steep angles also cause the amount of bending of the light rays to be harder to control, and likewise increase the amount of room light which upon striking the screen finds its way back into the room instead of going through to the back. It is, therefore, desirable when considerable angles of spread are called for, to divide the refraction between the two surfaces, by molding crossed corrugations into both sides, so registered that the refracting elements become bi-concave and bi-convex lenses as illustrated in Fig. 7. Such dividing of the refraction is likely to be desirable if the steepest angle of any portion of a surface element, when calculated on the basis of a single corrugated surface, exceeds about 35 degrees. This steepest angle will be the resultant of slopes due to both sets of corrugations, and will be between a tangent plane and the mean plane of the screen, intersecting said mean plane, neither in a horizontal nor a vertical but a diagonal line of intersection. When both surfaces are employed for providing the desired spreading, it may be desirable to use a second sheet of material formed to the shape of a Fresnel lens, and located close behind the diffusing screen.

Since the observation surface of the screen does not have any sharp bottomed grooves or sharp ridges as shown in the above mentioned patent, the molding operation is facilitated resulting in a high percentage of usable screens.

I claim as my invention:

1. A rear-projection viewing screen of transparent material having at least one diffusing surface, all horizontal cross-sections of said screen having identical surface contours, and all vertical cross-sections of said screen having identical surface contours, all of said contours consisting of a series of alternate concave and convex parabolic arcs, the tops and bottoms of the arcs of the horizontal cross-sections being co-planar, respectively, and the tops and bottoms of the arcs of the vertical cross-sections being co-planar, respectively.

2. A rear projection viewing screen in accordance with claim 1 in which the opposite surface of said screen consists of a Fresnel lens having closely spaced convolutions.

3. A rear projection viewing screen in accordance with claim 1 in which the opposite surface of said screen consists of a Fresnel lens, at least one of said surfaces being roughened to provide additional diffusion.

4. A rear-projection screen of transparent material having a dimpled diffusing surface, the tops and bottoms of said dimples being co-planar, respectively, all horizontal cross-sections having the same surface contours made up of a series of arcuate segments constituting lenses having equal focal lengths to provide a certain predetermined angle of light spread, and all cross-sections in a direction at right angles to the direction of said first mentioned cross-sections having the same surface contours made up of a series of arcuate segments constituting lenses having focal lengths differing from those of said first mentioned segments to provide a different predetermined angle of light spread.

5. A rear-projection screen in accordance with claim 4, in which the focal length of the lenses spreading light in the horizontal direction is less than the focal length of the lenses spreading light in the vertical direction to obtain a larger light spread in a horizontal plane than in a vertical plane.

6. A rear-projection screen of transparent material, having a diffusing surface, consisting of corrugations of uniform pitch and substantially equal curvatures, on which is superimposed another series of corrugations having their axes substantially at right angles to the first mentioned corrugations, the tops and bottoms of said corrugations being co-planar, respectively, and the pitch of the corrugations in both directions being small in comparison with the smallest elements of detail of the pictures for which the screen is intended to be used, all cross-sections of the screen taken along the axis of any series of corrugations having identical curvatures.

7. A screen in accordance with claim 6, wherein the diffusion caused by the corrugations is supplemented by a very limited diffusion of a random character.

8. A screen in accordance with claim 6, the other surface of which is formed to produce progressively greater refraction toward the edges of the screen whereby diverging light from the projector is caused to re-converge.

9. A screen in accordance with claim 6 having both surfaces formed with superimposed crossed corrugations of identical pitch, and in such relative registration that the points of maximum height on one surface are directly opposite the points of maximum height on the other surface.

10. A rear-projection screen in accordance with claim 6, the surfaces of which have been treated to reduce reflections.

11. A rear-projection screen in accordance with claim 6, the surfaces of which have been treated to reduce reflections.

12. A rear-projection screen having a refracting surface, any horizontal cross section of which has the same surface curvature as any other horizontal cross-section and is a repetitive undulating curve comprised of substantially parabolic segments, and any vertical cross section of which has the same surface curvature and is a repetitive undulating curve comprised of substantially parabolic segments, the focal lengths of the parabolic segments in the horizontal plane being less than the focal lengths of the parabolic segments in the vertical plane.

13. A rear-projection screen in accordance with claim 12, the surfaces of said screen being treated to reduce reflections.

EDWARD W. KELLOGG.

REFERENCES CITED

The following references are of record in the file of this patent:

UNITED STATES PATENTS

| Number | Name | Date |
|---|---|---|
| 847,854 | Voorhorst | Mar. 19, 1907 |
| 1,315,964 | Jantsch | Sept. 16, 1919 |
| 1,491,830 | Troeger | Apr. 29, 1924 |
| 1,935,220 | Wildhaber | Nov. 14, 1933 |
| 2,028,496 | Chiti | Jan. 21, 1936 |
| 2,044,620 | Matthai | June 16, 1936 |
| 2,064,322 | Ruppert | Dec. 15, 1936 |
| 2,086,556 | Jacobson | July 13, 1937 |
| 2,106,623 | Proctor et al. | Jan. 25, 1938 |
| 2,200,646 | Strong et al. | May 14, 1940 |
| 2,207,835 | Sukumlyn | July 16, 1940 |
| 2,268,351 | Tanaka | Dec. 30, 1941 |
| 2,271,196 | Kaszab | Jan. 27, 1942 |
| 2,279,555 | Brown et al. | Apr. 14, 1942 |
| 2,294,865 | Frankenthal et al. | Sept. 1, 1942 |
| 2,364,369 | Jelley et al. | Dec. 5, 1944 |